Feb. 25, 1964
B. A. THULE
3,122,345
HELICOPTER LANDING GEAR SYSTEM AND GROUND
ENGAGING SUPPORT CONSTRUCTION
Filed April 27, 1962
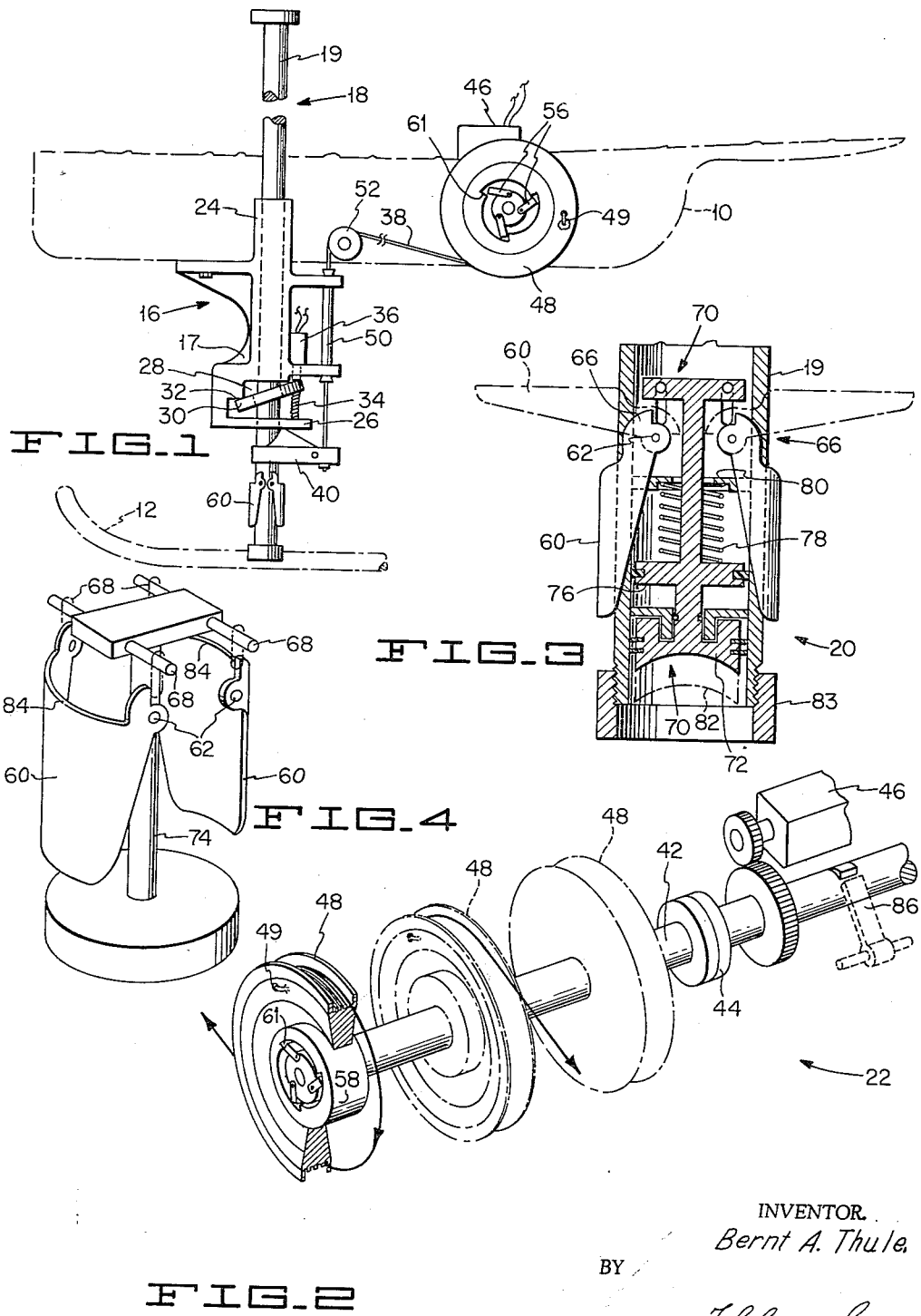
INVENTOR.
Bernt A. Thule,
BY
Flehr and Swain
ATTORNEYS.

United States Patent Office 3,122,345
Patented Feb. 25, 1964

3,122,345
HELICOPTER LANDING GEAR SYSTEM AND GROUND ENGAGING SUPPORT CONSTRUCTION
Bernt A. Thule, General Delivery, Columbia, Calif.
Filed Apr. 27, 1962, Ser. No. 190,731
9 Claims. (Cl. 244—102)

This invention relates to an improved landing gear system for vertical take-offs and landings and more particularly to such a landing gear system for supporting a helicopter in a substantially level attitude on an irregular or uneven landing surface.

Means have heretofore been used to support a helicopter in a substantially level attitude on irregular terrain by means of legs which can be extended to contact the ground at differing distances with respect to the helicopter. However, such apparatus has been of a rather involved, complex nature sometimes adding considerable weight to the aircraft not to mention increased maintenance expense.

Therefore in general, it is an object of this invention to provide a simplified landing gear system for vertical landings on undeveloped, irregular terrain.

Another object of the invention is to provide a landing gear system wherein each ground engaging support unit is free to drop under its own weight independently of the others.

Still another object of the invention is to provide a simple mechanical (as distinguished from hydraulic) system wherein notwithstanding the varying extended positions of the support units, a single motor can fully retract them all.

In operating a helicopter, as in rescue work, in undeveloped terrain regions, it is not uncommon to need to land on unpredictable surfaces such as soft ground. Therefore another object of the invention is to provide a landing gear system suitable for use in such operations. It is a more particular object to provide a landing gear system with improved ground engaging supports which automatically provide an increased load supporting area when the supports engage and sink into soft footing.

Further objects and features of the invention will appear from the following description of a preferred embodiment taken in conjunction with the accompanying drawing.

Referring to the drawing:

FIGURE 1 is an elevation view of a landing gear system incorporating the invention.

FIGURE 2 is a schematic perspective view of operating elements shown in FIGURE 1.

FIGURE 3 is an elevation cross section view of apparatus for landing in soft terrain.

FIGURE 4 shows a portion of the structure shown in FIGURE 3 drawn as a schematic perspective view for clarity.

Briefly stated, in accordance with my invention extensible, spaced landing support units are carried from the body of a helicopter for extension and retraction movements, so that as the helicopter hovers over the ground within range of extension of the support units, the latter can be set free to fall under their own weight independently of each other to seek contact with the ground. As each support unit strikes the ground it is locked against retraction movement thereof so as to support the load of the descending helicopter. In one embodiment the support units are provided with means for automatically increasing the supporting area thereof upon entry of the support unit into soft terrain. Although the support units are arranged to fall independently of one another to varying extended positions, as the helicopter leaves the ground the support units drop freely through a complete extension thereof to enable them all to be simultaneously completely retracted by a single motor.

While the invention is shown and described with respect to a "helicopter," the apparatus is intended similarly to apply to any aircraft which is adapted for vertical landing or take-off, as distinguished from aircraft which require horizontal motion to provide the necessary lift to support the aircraft in the air. Thus as shown in FIGURE 1 a body portion 10 of a helicopter is shown. The helicopter may be equipped with conventional landing apparatus such as a pair of skids 12, only one of which is shown. It is to be understood that in the usual instance the skids would remain fixed with respect to the helicopter body by suitable struts.

In practice I employ either three or four support units, which are of like construction. However only one such unit is shown and described. The apparatus as shown in FIGURE 1 generally includes a mounting assembly 16, an extensible support unit 18 having a foot assembly 20, and a cable control system 22.

Each extensible support unit 18 includes a leg section 19 which may be in the form of a metal tube or rod, arranged for sliding contact in mounting assembly 16 secured to the aircraft. The assembly 16 provides means permitting legs 19 to fall freely under their own weight, but locking them against reverse movement so as to support the load of the helicopter. Assemblies 16 may be formed as a casting 17 including a sleeve portion 24, and a laterally extending portion 26. Portion 26 has a hole coaxially aligned with the bore of sleeve 24 so as to guide the leg of support unit 18 for vertical retraction and extension movements. As shown, portion 26 is formed spaced from sleeve portion 24 to provide a gap 28 to accommodate means for locking each support unit 18 against retraction movement.

To provide suitable locking means, I have shown one or more so-called "grip washers" 30 disposed in gap 28 and placed in position around the leg of the support unit 18. Washers 30 are formed of hardened metal adapted to readily slide along the legs when oriented with their planes at right angles to the leg axis, but effectively gripping the leg of the support unit 18 when cocked at an angle thereto as shown in FIGURE 1. Such a grip washer or washers have been used for securing step-by-step motion between various mechanical parts, as for example in automotive jacks.

In order to cock the washer 30 to prevent upward movement of the support unit with respect to the body 10 there is provided a shoulder 32 formed in gap 28. So as to normally tip washer 30 at an angle with respect to the leg, a helical spring 34 is interposed between the edge of washer 30 and leg alignement portion 26. Accordingly, the washer 30 permits the leg to fall freely. For retraction movement, however, the locking action of washer 30, can be released by means such as the solenoid 36 which can be energized to press the edge of washer 30 against the action of spring 34, thereby pivoting the washer about shoulder 32 to align the hole in the washer with the leg axis.

The cable control system 22 for operating support units 18 includes a windlass-like arrangement whereby cables 38 coupled to clamps 40 on each support unit 18 pay out independently of each other. The cable control system, however, serves to reel in all support units concurrently to fully retracted positions.

Thus, as schematically shown in FIGURE 2, a shaft 42 is mounted for rotation in opposite directions and is provided with a suitable clutch 44 serving to couple shaft 42 to a motor 46 via suitable gearing, and provided with suitable manual control means (not shown). Depending on the nature of the gearing employed, the motor armature, of course, could be permitted to turn backwards as the cables are payed out, thereby eliminating the clutch. Assuming that only three support units 18 are associated with a particular helicopter, three sheaves 48 of like construction are supported upon shaft 42. Each of the three cables 38 is led upwardly from clamps 40 through a tubular cable guide 50, over a small pulley 52, winding themselves around sheave 48, a sufficient number of turns to provide the desired maximum extent of cable, and made fast to the associated sheave 48 at the cable's bitter end 49. If desired, suitable "drag" can be applied to the paying out action of the cables as by a spring tensioned friction loading of the sheaves by forming a friction surface on a face of each so as to cooperate with a brake disc urged theragainst. By disengaging clutch 44, cables 38 pay out under action of the weight of their respective support units 18. As cables 38 pay out, each of sheaves 48 rotates shaft 42 clockwise (as viewed in FIGURE 1). Changes in direction of the cables can be reduced by leading the cable either from the top or bottom of its sheave, as desired, for support units located front and rear.

In order to permit each cable to pay out independently, a coupling means is provided between shaft 42 and each of sheaves 48 whereby a driving connection from each sheave to the shaft 42 is formed during clockwise rotation of the sheaves while at the same time permitting the shaft to overrun the sheaves as the weight of their associated support units is relieved therefrom by contact with the ground. This can be done by providing a plurality of pawls 56 pivotally secured to shaft 42 within the hub 58 of each sheave. The interior of each hub is provided with a plurality of coacting abutments or shoulders 61. As thus arranged clockwise rotation of any sheave 48 rotates shaft 42.

The foot assembly 20 of each support unit preferably includes a pair of leaf-like supplemental ground engaging load support members 60 pivoted on a pin at 62 to the leg 19 of each support unit 18.

Supplemental members 60 are formed with an upwardly extending ear or locking tab 66. Tabs 66 have a flat side disposed to contact a locking pin 68 arranged to be moved upwardly inside leg 19 under action of a plunger unit 70.

Plunger 70 is provided with a piston shaped head 72 connected to a piston rod 74. In order to insure an aligned longitudinal movement between plunger 70 and leg 19, head 72 is provided with a pair of piston rings and rod 74 is formed with a journal-like portion 76 similarly fitted. Plunger 70 is arranged to act against the force of a spring 78 interposed between portion 76 and a bulkhead 80 secured to the inside of leg 19. Plunger 70 as shown in FIGURE 3 is in its uppermost position. However, the phantom line 82 represents its lowermost movement. Therefore, it can be seen that plunger 70 is always located more or less recessed from the open end of leg 19 to protect against release of members 60 by underbrush and the like. Thus, only if the foot assembly sinks into soft ground will plunger 70 be moved upwardly to release members 60. The degree to which head 72 is recessed from the end of leg 19 can be varied by using an adjustable, replaceable wearing collar 83 or sleeve which can be screwed onto and suitably locked to the end of leg 19. Accordingly, collar 83 prevents undesired triggering of the locking pins 68, while providing a replaceable wear surface for landing on hard ground. Furthermore, members 60 are located high enough up on the leg 19 so that insertion of the leg into soft ground acts as a fixed "stake" to prevent slippage.

After upward movement of plunger 70, as the soft ground forces its way between members 60 and the exterior of legs 19, members 60 will move from alongside the foot portion to a position extending in a direction transversely thereof thereby enlarging the contact area of the foot assembly.

Operation of my device is as follows: After maneuvering the helicopter to a hovering position about the chosen landing surface and descending to within range of all the support units, clutch 44 is operated to disengage shaft 42 from motor 46 thereby setting the support units 18 free to drop under their own weight guided by the sleeve portions 24 of each mounting assembly. As units 18 fall, cables 38 pay out by transmitting the weight of the support units 18 to sheaves 48. All sheaves 48 thus rotate clockwise as viewed in FIGURE 1 to cause abutments 61 and pawls 56 to engage, thereby providing a driving connection therebetween to extend cables 38.

As each support unit strikes the ground, the weight thereof is relieved from its associated cable 38 so as to terminate clockwise rotation of its particular sheave. However, since each sheave independently can rotate shaft 42, the latter will continue to turn clockwise until the last support unit makes contact with the ground. This continued rotation of shaft 42, however, does not pay out cable to the support units which have previously landed inasmuch as the driving connection from sheaves 48 to shaft 42 permits shaft 42 to over-run. During the free falling movement of units 18 springs 34 permit washers 30 to align their planes substantially normal to the axis of legs 19 allowing extension of the latter. However, as support units 18 come to rest upon the ground, and become load supporting, washers 30 are carried upwardly in gap 28, aided by springs 34, until the shoulder 32 cocks the washer to cause it to bite into the leg and prevent further upward movement. Therefore the load of the helicopter is transmitted to the ground via the solid casting of the mounting assembly 16, shoulder 32, washer 30, and leg 19 of each support unit 18, to provide a simple, yet firm support.

If the landing is to be made on soft ground or other deformable landing surface material, those foot assemblies 20 which sink into terrain, automatically spread leaf-like supplemental ground engaging members to increase the area of contact with the ground. Assuming the soft surface material to be mud, for example, it will force its way up into the open end of leg 19, moving piston 72 upwardly thereby unlocking the pins 68. Subsequently, the mud rising on the outside of leg 19 forces its way under the bottom lip of members 60 causing them to spread out as shown in dashed lines in FIGURE 3. Upward movement of members 60 is ultimately limited by contact between their top edge 84 and the outside of leg 19.

When the aircraft takes-off all support units 18 are permitted to drop to their full extent by gravity. Clutch 44 is conditioned to couple motor 46 to shaft 42 whereby operation of motor 46 drives shaft 42 counter clockwise as viewed in FIGURE 1. Solenoids 36 are energized to unlock grip washers 30. Rotation of shaft 42 provides a driving connection to all sheaves 48 to concurrently wind up all cables 38 to a completely retracted position, limited for example by contact of a reinforced upper portion of cable attachment clamps 40 with the under surface of portion 26 of assembly 16.

As foot assemblies 20 are withdrawn from soft ground, spring 78 drives plunger 70 downwardly, aided by partial suction formed beneath plunger 70 thereby lowering the pins 68 onto the rounded cam surface of tabs 66. Members 60 pivot downwardly by gravity causing pins 68 to ride along the curved surface of tabs 66, until reaching a substantially vertical orientation. At this point pins 68 drop into position to lock the members 60 alongside.

As thus arranged it can be seen that as support units 18 are lowered through underbrush and the like, the supplemental ground engaging members 60 will be held alongside but upon entry into a deformable surface material, i.e. a soft footing, they are automatically enlarged. Furthermore, it should be noted that the return movement of tabs 66 serves to twist plunger 70 to correct any tendency for pins 68 to axially rotate out of locking alignment with tabs 66.

After support units 18 have been fully retracted, a dog 86 can be utilized, if desired, to relieve the holding action of motor 46.

While there have been shown and described and pointed out the fundamental novel features of the invention as applied to a preferred embodiment, it will be understood that various omissions and substitutions and changes in form and detail as well as in operation may be made by those skilled in the art, without departing from the spirit of the invention. For example, while the support units have been shown as attached directly to the body of the helicopter, by using suitable clamps bolted to the conventional under-carriage such as the skids shown, a detachable and portable kit-type unit can be provided. Therefore, it is the intention to be limited only as indicated by the scope of the following claims.

I claim:

1. In an aircraft landing gear system for supporting an aircraft in a substantially level attitude on an irregular supporting surface, at least three extensible, spaced landing support units, each of said units being supported from the body of said aircraft for extension and retraction movements with respect thereto, means serving to hold said units in a retracted position, means serving to set said support units free to be extended under their own weight independently of each other from said retracted position to seek contact with said supporting surface, and means for locking such support unit against retraction movement thereof.

2. Landing gear apparatus as defined in claim 1 in which the locking means is continuously operative to lock each of said support units against retraction movement thereof.

3. Landing gear apparatus as defined in claim 2 in which said locking means includes means guiding said support units in rectilinear sliding contact with respect to said aircraft, a grip washer disposed around an elongated portion of each of said units, and means for cocking the plane of said washers at an angle to the axis of said portions under retraction movement thereof.

4. Landing gear apparatus as defined in claim 1 further including means serving to release said locking means for retracting said units, and in which the penultimate said means includes retraction means common to all said support units for concurrently retracting same, whereby said units fall independently of each other but retract together.

5. Landing gear apparatus as defined in claim 1 in which each of said support units includes a foot portion and means serving to increase the supporting area of same responsive to entry of said foot portion into a deformable supporting surface material.

6. In an aircraft landing gear system having spaced, landing support units, each of said units including a ground engaging foot portion, a pair of leaf-like supplemental ground engaging load support members pivoted to each of said foot portions to move from alongside said foot portions to a position extending in a direction transversely thereof to enlarge said portions to support the aircraft in soft ground, means serving to lock said supplemental members alongside their respective foot portions, and means serving to release said locking means responsive to entry of said foot portion into a deformable supporting surface material.

7. Landing gear apparatus as defined in claim 6 wherein the last named means includes a plunger associated with each of said foot portions and movable with respect to same on entry thereof into said material, said plunger serving to release said locking means under said movement of the plunger.

8. In an aircraft landing gear system for supporting an aircraft in substantially level attitude on an irregular surface, at least three extensible, spaced landing support units slidably supported with respect to the body of the aircraft for extension and retraction movements, a flexible cable coupled to each of the support units for controlling same, windlass means operating said cables, said windlass means including a shaft rotatable in a first direction in paying out said cables to extend said support units, and rotatable in a second direction for winding up said cables to retract said support units, a plurality of sheaves supported on said shaft, each said sheave being adapted to receive a turn therearound of one of said cables to transmit the weight of an associated support unit to rotate the sheave in said first direction, a first driving connection transferring the rotation of each sheave in said first direction to said shaft, said first driving connection further serving to permit said shaft to over-run said sheaves whereby said shaft can continue to rotate in said first direction while paying out the cable of only those sheaves receiving the weight of their associated support units, means for releasably locking each of said support units against said retraction movement thereof, a second driving connection transferring rotation of said shaft in said second direction to said sheaves to wind up said cables, and motive means for driving said shaft in said second direction to retract said support units together.

9. Aircraft apparatus as defined in claim 8 in which said motive means comprises a single motor, and a clutch serving to couple said motor to said shaft whereby said clutch sets said support units free to seek their maximum extent and whereby said motor completely retracts same.

References Cited in the file of this patent

UNITED STATES PATENTS

| | | |
|---|---|---|
| 2,750,133 | Lebold | June 12, 1956 |
| 2,918,234 | McConica | Dec. 22, 1959 |
| 2,930,551 | Haberkorn | Mar. 29, 1960 |
| 3,038,685 | Hofmann | June 12, 1962 |